Jan. 27, 1948.   C. I. HALL   2,435,076
ELECTRICALLY ACTUATED VALVE
Filed April 25, 1944
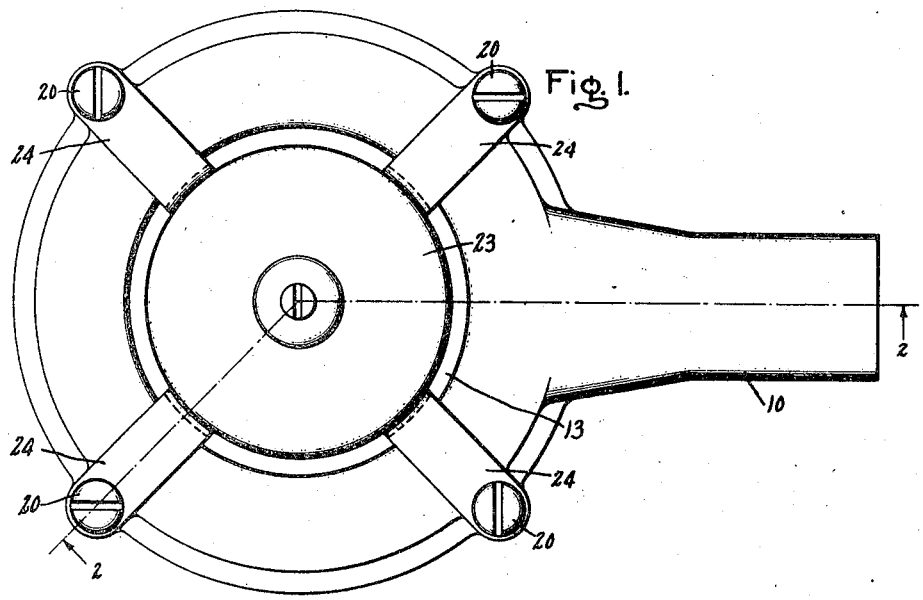
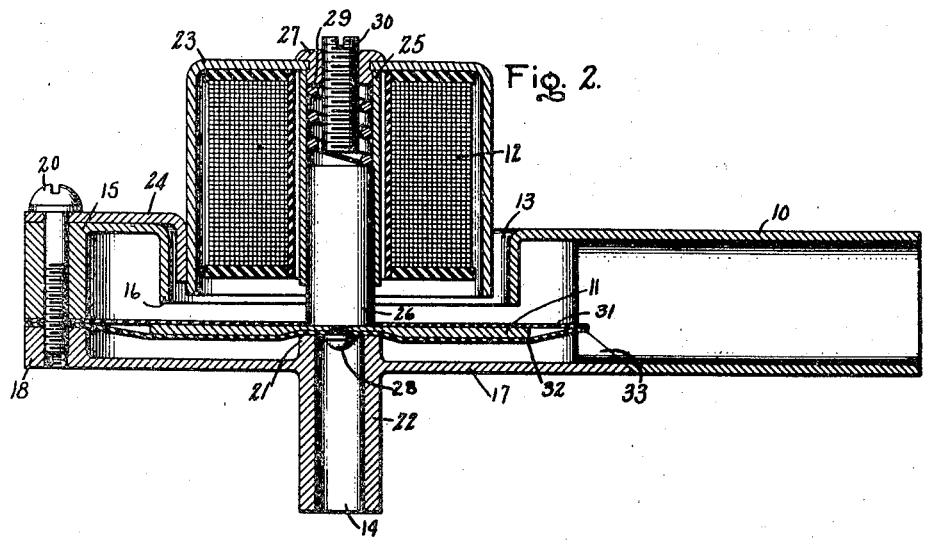
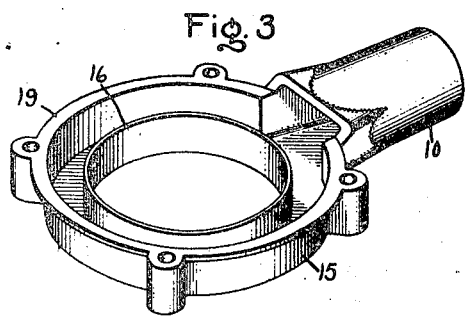
Inventor:
Chester I. Hall,
by Harry E. Dunham
His Attorney.

Patented Jan. 27, 1948

2,435,076

UNITED STATES PATENT OFFICE 2,435,076

ELECTRICALLY ACTUATED VALVE

Chester I. Hall, Vischer's Ferry, N. Y., assignor to General Electric Company, a corporation of New York Application April 25, 1944, Serial No. 532,677

4 Claims. (Cl. 137—139)

My invention relates to electrically actuated valves, more particularly to electromagnetically operated valves, and has for its object a simple, reliable and compact electrically actuated two-way valve having two relatively large and small apertures which are selectively opened and closed.

My invention is especially useful in automatic resuscitator devices such as described and claimed in a copending patent application Serial No. 489,045, filed by Arthur J. Kizaur on May 29, 1943, now Patent No. 2,418,034, for Respiration apparatus, assigned to the same assignee as this invention.

In carrying out my invention in one form I provide walls forming a circular chamber provided with oppositely disposed large and small openings, together with an operating electromagnet mounted in the large opening and operating a diaphragm valve member to selectively open and close the openings.

For a more complete understanding of my invention, reference should be had to the accompanying drawing, Fig. 1 of which is a plan view of a valve embodying my invention; Fig. 2 is a sectional view taken along the line 2—2 of Fig. 1 looking in the direction of the arrows; while Fig. 3 is a view in perspective of one of the parts to a reduced scale and inverted with respect to Fig. 2.

Referring to the drawing, I have shown my invention in one form as applied to a conduit or duct 10 and comprising a plate or diaphragm member 11 which is moved by a magnet coil 12 selectively to close and open the openings or ports 13 and 14 on opposite sides of the plate.

As shown, the duct 10 is provided on its end with a circular chamber formed by a circular member 15, shown inverted in Fig. 3, and having a side wall provided with the relatively large concentric opening 13 defined by an inwardly extending flange 16. The circular chamber is completed by a plate member 17 parallel with the side wall of the member 15 having a flanged periphery 18 which is secured on a flange 19 around the periphery of the member 15 by means of suitable screws 20, the two flanges 18 and 19 forming an end wall for the two substantially parallel walls 15 and 17. The plate 17 is provided with an inwardly extending flange 21 which defines the relatively small opening 14, the inner oppositely disposed ends of the flanges 16 and 21 being in parallel relation with each other, spaced apart and concentric with the circular member 15. Also the plate 17 is provided with an outwardly extending flange 22 forming an external pipe around the opening 14 for the attachment of fluid conveying means such as a rubber hose.

For mounting purposes, the magnet coil 12 is secured in an inverted cup-like enclosure 23, the lower end of which extends downward into the opening formed by the flange 16 in concentric relation therewith. It is secured in position by radially extending supporting straps 24, four being shown secured equally spaced apart to the cup member 23 and extending along the upper surface of the member 15 to which they are secured by the bolts 20. Inside the member 23 in concentric relation therewith is a tubular guide 25 for a plunger type armature 26 secured to the upper or bottom wall of the member 23 by a plug member 27. At its lower end the armature is connected by a screw 28 to the center of the metal diaphragm 11 which is somewhat larger in diameter than the flange 16. A helical spring 29 in the guide 25 biases the armature downward to the position shown in which the diaphragm rests on the flange 21 and closes the port 14. An adjustment screw 30 is provided in the plug 27 to limit the upward movement of the armature when the coil 12 is energized.

For the purpose of assuring fluid-tight seating of the diaphragm on the ends of the flanges 16 and 21, the diaphragm is provided on its sides with layers or coatings 31 and 32 made of a resilient material. Preferably, these coatings 31 and 32 are made from a rubberlike material, such as neoprene, containing a 10 per cent plasticizer. These layers 31 and 32 are larger in diameter than the metal diaphragm 11 and extend between the flanges 18 and 19 so as to serve as a sealing gasket between the two parts 15 and 17.

The layers 31 and 32 preferably are secured to the diaphragm 11. This may be done by first cleaning the surfaces of the diaphragm, which is preferably made of steel, with emery cloth and cleaning fluid, coating the surfaces with rubber cement, placing the layers of neoprene on the diaphragm, and then heating the assembly under pressure to 150° C., at which temperature it is held for five minutes. Then the assembly is allowed to cool to room temperature with the pressure still applied. This provides a satisfactory bond between the layers 31 and 32 and the diaphragm.

Another function of the layers 31 and 32 of resilient material by reason of the fluid tight connection between their peripheries and the end wall formed by the flanges 18 and 19 is to separate or divide the interior of the circular chamber formed by the parts 15 and 17 into two parts or chambers, i. e., a lower part communicating with the port 14, which may be an inlet port for oxygen, and an upper part communicating with the port 13 which may be an exhalation port. Thus the flanges 18 and 21 provide a space below the diaphragm, as seen in Fig. 2, this space communicating with the duct 10 at the junction 33 between the member 17 and the duct 10. At this point it will be observed a peripheral portion of layers 31 and 32 extends edgewise across the end of the duct 10 to connect the duct with both parts of the chamber. Also, the flange 16 provides a space above the diaphragm. As shown, a tight-fitting matched joint is provided at the point 33 between the members 15 and 17.

It will be noted that the construction of the various parts provides for the freest possible flow of gas through the large opening or port 13, i. e., the port provided by the annular space between the cup member 23 and the flange 16. Thus it is contemplated that gas may be expelled from the duct 10 through the port 13 at very low pressure whereas the relatively small opening 14 will admit gas to the duct 10 under a relatively high pressure. In particular, the annular space or chamber provided around the flange 16 between the flange and the side wall of the member 15 provides for the flow of gas from the duct 10 against very little resistance through the annular chamber to all points of the annular port 13 which is many times larger than the port 14.

While I have shown a particular embodiment of my invention, it will be understood of course that I do not wish to be limited thereto since many modifications may be made and I therefore contemplate by the appended claims to cover any such modifications as fall within the true spirit and scope of my invention.

What I claim as new and desire to secure by Letters Patent of the United States, is:

1. An electromagnetically operated valve comprising walls forming a duct and a chamber connected to one end of said duct, said chamber being formed by an end wall joining substantially parallel walls provided each with an opening and said openings being oppositely disposed and relatively large and small with respect to each other, a magnet coil, supporting means for securing said magnet coil in said large opening, said magnet coil being substantially smaller than said large opening thereby to leave a space between it and the wall of said large opening, an armature for said magnet coil, a diaphragm between said parallel walls, a connection between said diaphragm and said armature for movement of said diaphragm by energization of said magnet coil to close one of said openings, means for biasing said armature to an unattracted position in which said diaphragm closes the other of said openings, and a fluid tight connection between the periphery of said diaphragm and said end wall so that said diaphragm divides said chamber into two parts with a portion of said diaphragm extending edgewise across said duct to connect said duct with both parts of said chamber.

2. An electromagnetically operated valve comprising a duct provided with walls closing one end of said duct to form a chamber including an end wall and two opposite walls provided each with an opening and said openings being oppositely disposed and relatively large and small with respect to each other, a flange on each of said opposite walls around its opening extending toward the other wall so that the ends of said flanges are in spaced relation with each other between said opposite walls, a magnet coil, supporting means including a plurality of brackets for securing said magnet coil in said large opening, said magnet coil being substantially smaller than said large opening thereby to leave a space between it and said larger flange, an armature for said magnet coil, a diaphragm between the spaced ends of said flanges, a connection between said diaphragm and said armature for movement of said diaphragm by energization of said magnet coil into engagement with one of said flanges thereby to close one of said openings, means for biasing said armature to an unattracted position in which said diaphragm engages the other of said flanges thereby to close the other of said openings, and a fluid tight connection between the periphery of said diaphragm and said end wall so that said diaphragm divides said chamber into two parts with a portion of said diaphragm extending edgewise across said duct to connect said duct with both parts of said chamber.

3. An electromagnetically operated valve comprising walls forming a duct and a chamber connected to one end of said duct, said chamber being formed by an end wall joining walls substantially parallel with each other provided respectively with oppositely disposed relatively large and small openings, a flange on each of said substantially parallel walls around said openings extending toward the other wall so that the ends of said flanges lie in substantially parallel planes spaced apart between said walls, a magnet coil, means supporting said magnet coil on one of said walls with said magnet coil extending into said large opening in concentric relation therewith, said magnet coil being smaller than said large opening thereby to leave a circular opening between it and said large flange, an armature for said magnet coil, a plate somewhat larger than said large flange positioned between the ends of said flanges and connected to said armature so as to be movable by said armature into engagement with one or the other of said flanges thereby to open and close said openings, means for biasing said armature to an unattracted position in which said plate closes one of said openings, and layers of resilient material on opposite sides of said plate secured to said plate having their edges secured to said end wall thereby to divide said chamber into two parts with peripheral portions of said layers extending edgewise across said duct to connect said duct with both parts of said chamber.

4. An electromagnetically operated valve comprising a duct provided with a substantially circular portion closing one end of said duct, said circular portion having a cylindrical end wall joining substantially parallel walls, said parallel walls being provided each with a central opening and said openings being relatively large and small with respect to each other, a flange on each of said parallel walls around its opening extending toward the other parallel wall so that the ends of said flanges are in spaced relation with each other between said parallel walls, a magnet coil, supporting means including a plurality of brackets for securing said magnet coil to said circular portion concentrically in said large opening, said magnet coil being substantially smaller than said large opening thereby to leave a substantially large space between it and said larger flange, a plunger armature for said magnet coil, a diaphragm between the spaced ends of said flanges, a connection between said diaphragm and said armature for movement of said diaphragm by energization of said magnet coil into engagement with said larger flange thereby to close said large opening, spring means for biasing said armature to an unattracted position with said diaphragm in engagement with said smaller flange thereby to close said small opening, and a fluid tight connection between the periphery of said diaphragm and said end wall whereby said diaphragm divides said circular portion into two parts with a portion of said diaphragm extending edgewise across said duct to connect said duct with both parts of said circular portion.

CHESTER I. HALL.

REFERENCES CITED

The following references are of record in the file of this patent:

UNITED STATES PATENTS

| Number | Name | Date |
| --- | --- | --- |
| 1,245,233 | Hynes | Nov. 6, 1917 |
| 2,288,912 | Mears | July 7, 1942 |
| 2,289,456 | Ray | July 14, 1942 |